United States Patent
Thompson

(10) Patent No.: US 6,347,639 B1
(45) Date of Patent: Feb. 19, 2002

(54) FUEL SYSTEM

(75) Inventor: Robert H. Thompson, Redford, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/610,726

(22) Filed: Jul. 6, 2000

(51) Int. Cl.⁷ .................................................. B65B 1/04
(52) U.S. Cl. .................... 137/15.08; 137/202; 137/576; 137/587; 141/59; 123/516
(58) Field of Search ................................. 137/587, 576, 137/202, 15.01, 15.08; 123/516; 220/530, 86.2; 141/59

(56) References Cited

U.S. PATENT DOCUMENTS

| | | | | |
|---|---|---|---|---|
| 4,958,655 A | * | 9/1990 | Danek | 137/80 |
| 5,526,795 A | * | 6/1996 | Thompson et al. | 123/516 |
| 5,529,086 A | * | 6/1996 | Kasugai et al. | 137/202 |
| 5,568,828 A | * | 10/1996 | Harris | 220/86.2 X |
| 5,713,401 A | | 2/1998 | Weeks | |
| 5,769,057 A | * | 6/1998 | Hashimoto et al. | 123/516 |
| 5,816,287 A | * | 10/1998 | Hyodo et al. | 137/587 |

\* cited by examiner

*Primary Examiner*—A. Michael Chambers
(74) *Attorney, Agent, or Firm*—Ford Global Technologies, Inc.

(57) ABSTRACT

A fuel system 10 which selectively receives and stores volatile fuel. System 10 includes a dynamic seal or air intake inhibitor 26 which is operatively disposed within fuel filler pipe 20 and which minimizes the amount of air ingested by fuel tank 12. System 10 further includes an air separation portion or chamber 16 that includes a recirculation aperture 30 and tapered valve 34 that are effective to automatically regulate the rate of vapor recirculation within system 10 based upon the amount of fuel and vapor within portion 16.

10 Claims, 1 Drawing Sheet

FUEL SYSTEM

FIELD OF THE INVENTION

The present invention generally relates to a fuel system and more particularly, to a vehicular fuel system which is adapted to receive, store, and selectively transport vaporific fuel to an engine and which includes an air intake inhibitor and a self-regulating recirculation system for vapor recovery.

BACKGROUND OF THE INVENTION

Vehicular fuel systems or assemblies are adapted to selectively receive, store and deliver fuel for use within and/or by an engine (i.e., an internal combustion type engine), effective to allow a vehicle to be desirably operated and driven.

Conventionally, these assemblies include a tank into which volatile or vaporific fuel is selectively placed and stored and several devices and/or components (i.e., a treatment canister) which are communicatively coupled to the tank and which allow fuel and vapors to be selectively transferred from the tank to other portions of the vehicles (e.g., to the engine). For example and without limitation, these devices and/or components cooperatively allow air and fuel vapors to be selectively purged from the tank, treated, and controllably released into the ambient environment or atmosphere, effective to selectively and desirably reduce pressure within the tank, and to allow the air dissolved within currently received fuel to be released or recirculated.

While these prior or conventional fuel assemblies do desirably receive and store fuel, they suffer from some drawbacks. For example, these prior fuel systems undesirably allow a relatively large amount of air to be ingested into the fuel tank, thereby increasing the pressure within the tank and requiring a large amount of air and vapor to be removed from the tank. During the required removal of this air and/or fuel vapor, some of the fuel vapors may undesirably escape from the externally deployed and previously delineated devices and components, thereby being released into the atmosphere. Moreover, the recirculation of air and vapors within these prior tanks typically occurs at a relatively constant rate, and therefore cannot be appropriately regulated based upon specific circumstances which may require more or less recirculation.

The present invention provides a fuel system which addresses these drawbacks, which substantially reduces or minimizes the undesirable ingestion of air into the tank, and which provides for the self-regulating recirculation of air and vapors within the system.

SUMMARY OF THE INVENTION

It is a first object of the present invention to provide a fuel system which overcomes at least some of the previously delineated drawbacks of prior fuel systems.

It is a second object of the present invention to provide a fuel system which includes a dynamic seal which substantially reduces and/or minimizes the amount of air ingested by a fuel tank.

It is a third object of the present invention to provide a fuel system which includes a self-regulating vapor recirculation system.

According to a first aspect of the present invention, a fuel system is provided. The fuel system includes a fuel tank; a fuel filler pipe which is communicatively coupled to the fuel tank and which has a widened portion; and a dynamic seal which is operatively disposed within the widened portion of the fuel filler pipe and which is adapted to selectively engage an inner surface of the widened portion, effective to allow fuel to pass through the fuel filler pipe, while substantially preventing air and vapor from passing through the fuel filler pipe and into the fuel tank.

According to a second aspect of the present invention, a fuel system is provided. The fuel system includes a filler tube which selectively receives fuel from a fuel dispensing nozzle; a recirculation tube which is communicatively coupled to the filler tube; and a first tank portion which is communicatively coupled to and selectively receives fuel from the filler tube. The first tank portion includes an aperture which communicates with the recirculation tube, an amount of fuel, and a buoyant member which floats upon the fuel and which includes a tapered valve which is selectively disposed within the aperture, the tapered valve being effective to controllably vary an area within the aperture through which vapors may pass into the recirculation tube, thereby automatically regulating vapor recirculation within the fuel system based upon the amount of fuel and vapor within the first tank portion.

These and other aspects, features, and embodiments of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
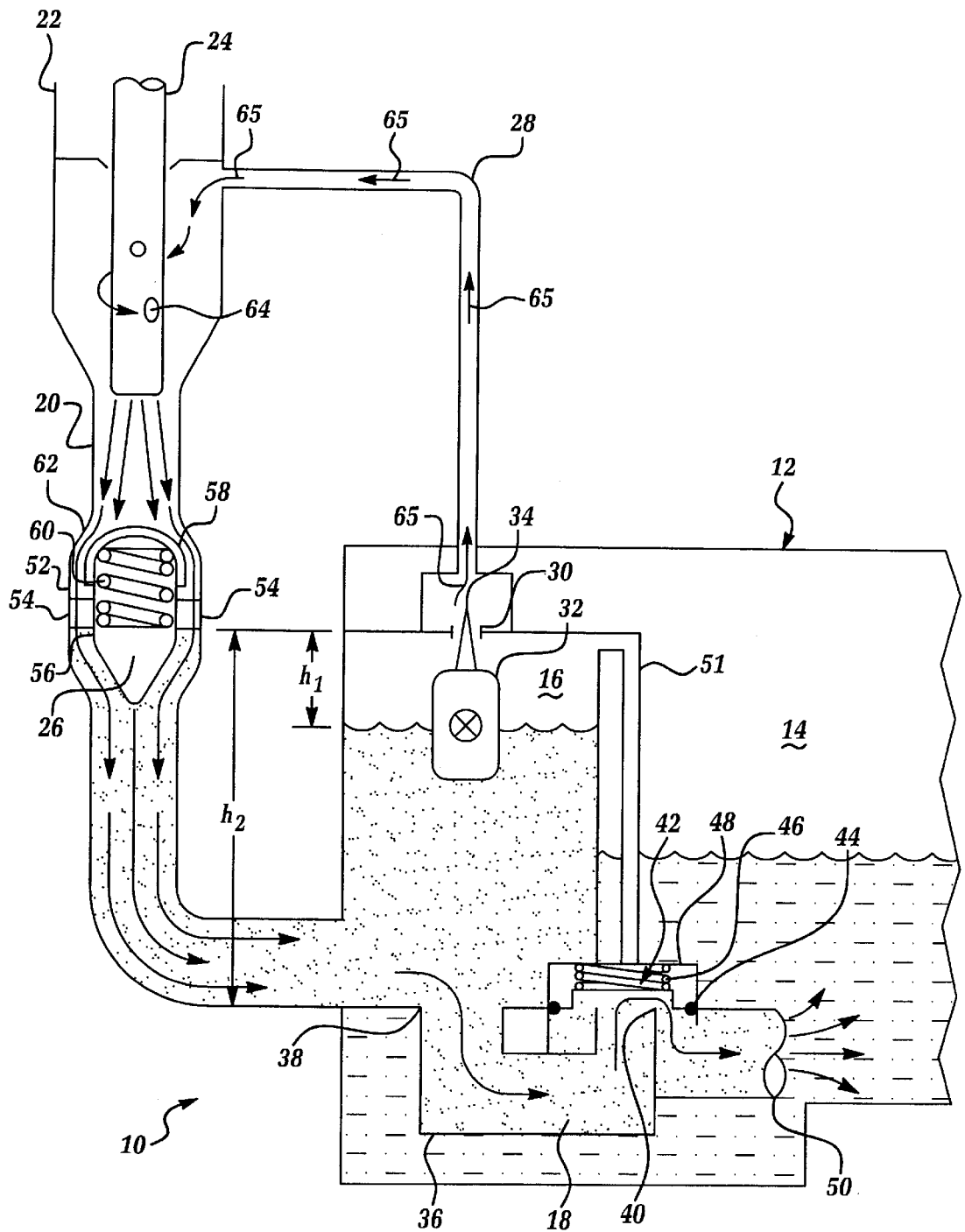
FIG. 1 is a sectional schematic view of a fuel system which is made in accordance with the teachings of the preferred embodiment of the invention.

Referring now to FIG. 1, there is shown a fuel assembly or system 10 which is made in accordance with the teachings of the preferred embodiment of the invention and which is adapted for use within a vehicle. As shown, fuel assembly 10 includes a container, receptacle, or tank 12 having a first fuel storage portion 14 and a second air separation or extraction chamber or portion 16 which is communicatively coupled to portion 14 by an outflow regulating portion or assembly 18. A fuel filler pipe or conduit 20 is communicatively connected to portion 16 and allows vaporific fuel to be selectively delivered to fuel tank 12. Fuel filler pipe 20 includes a conventional nozzle receiving apparatus 22, which is adapted to selectively and conformably receive a conventional fuel dispensing nozzle 24 having a vapor recovery port or passage 64. Fuel filler pipe 20 further includes a dynamic seal assembly or air intake inhibitor 26. A recirculation tube or conduit 28 communicatively connects fuel filler pipe 20 and separation chamber 16.

Fuel storage portion 14 is a generally cylindrical fuel storage container or tank which includes a fuel supply line, tube or conduit (not shown) which selectively carries fuel to the vehicle's engine (not shown). Fuel storage portion 14 may also include a conventional electrical fuel pump (not shown) which assists in delivering fuel to the vehicle's engine. In one non-limiting embodiment, fuel containing portion 14 comprises a variable volume fuel tank, such as the pumpless fuel system described in U.S. Pat. No. 5,526,795 of Thompson which is assigned to the present assignee and which is fully and completely incorporated herein by reference.

Air or vapor extraction chamber or portion 16, which may be integrally formed with portion 14, includes a metered recirculation aperture or orifice 30 which is formed within the top surface of portion 16 and which allows gas or vapor within portion 16 to be selectively recirculated or transferred through recirculation tube 28 and into filler tube 22 and port 64 in the direction of arrows 65. Portion 16 further includes a float or buoyant member 32 having a tapered top portion or needle valve 34 which selectively engages aperture 30 and is effective to fully close and/or seal aperture 30 when portion 16 is substantially full or completely filled with fuel, and to only partially close or engage aperture 30 when the portion 16 is only partially filled with fuel.

Outflow regulating portion 18 includes a tube or conduit 36 which includes a first end 38 which is communicatively coupled to portion 16 and a second end 40 which is selectively engaged by a spring loaded diaphragm or seal assembly 42. Seal assembly 42 includes a generally circular diaphragm member 44 and a conventional spring member 46 which is coupled to diaphragm 44 and to housing portion 48. Diaphragm 44 is selectively movable within portion 48 and more particularly, is movable from a first or "closed" position in which diaphragm 44 contacts end 40 of conduit 36, thereby sealing end 40 and preventing fuel from entering portion 14 of tank 12 through outflow portion or conduit 50, to a second or "open" position in which diaphragm 44 does not contact end 40, thereby allowing fuel to be transferred from portion 16 to portion 14 through conduits 36 and 50. Spring 46 normally holds and/or compressibly retains diaphragm 44 in its "closed" position (i.e., against end 40). Housing portion 48 is communicatively coupled to the top portion of chamber 16 by conduit 51.

Fuel filler pipe 20 includes a widened portion 52 in which dynamic seal assembly 26 is operatively disposed. One or more support members or portions 54 are attached to housing 56 of assembly 26 and to the inner surface of portion 52, thereby connecting and supporting assembly 26 within portion 52. Assembly 26 includes a generally semi-spherical convex valve member 58 that is coupled to a compressible spring member 60 that is coupled to housing member 56. Valve member 58 is selectively movable within portion 52 and more particularly, is movable from a first or "closed" position in which member 58 abuttingly engages the tapered portion or inner surface 62 of tube 20, thereby preventing air or vapor from passing through tube 20 and into tank 12, to a second or "open" position in which member 58 does not contact the inner surface of tube 20, thereby allowing fuel to be transferred between surface 62 and member 58 and into tank 12 (e.g., into portion 16 of tank 12). Spring 60 normally holds and/or compressibly retains member 58 in the first or "closed" position.

In operation, air intake inhibitor 26 substantially prevents and/or minimizes the ingestion of air and/or vapor during the refueling process. Particularly, during the refueling process, member 58 is held against tapered portion 62 until the weight and/or pressure of fuel from nozzle 64 causes spring 60 to compress, thereby allowing the fuel to pass through portion 52. Importantly, by requiring the presence of fuel to actuate or move member 58, assembly 26 minimizes the amount of air or vapor that is communicated into tank 12 through conduit 20. The stiffness or "spring constant" of spring member 60 is determined or selected in order to control the movement of member 58 in response to the fuel flow rate provided by nozzle 24 (e.g., the greater the fuel flow rate, the greater the compression of spring 60 and the greater the resulting area that is available for fuel flow). In one non-limiting embodiment, the spring constant of spring 60 is selected to be proportional to the fuel flow rate. This controlled movement and the shape of member 58 and portion 62 cooperate to control the effective fuel flow area within pipe 20, thereby controlling the pressure drop within the pipe 20 and further reducing the amount of ingested air and/or vapor. The generally spherical or bulbous shape of member 58 minimizes fuel flow disruption, while ensuring that the fuel flow completely engages the walls of pipe 20, thereby maximizing the efficiency of the provided seal.

Portion 16 substantially ensures that any ingested and/or dissolved air which is subsequently released from the fuel is controllably recirculated. The size of the "air bubble" or released air and/or vapor, represented by length $h_1$, is proportional to the amount of area in orifice 30 through which air and vapor may pass for recirculation. Particularly, due to the tapered shape of needle valve 34, as length $h_1$ increases (e.g., and the amount of air and vapor in portion 16 increases), the diameter or size of the portion of valve 34 that is resident within orifice 30 decreases, thereby increasing the area through which air and vapor may enter recirculation tube 28 (i.e., increasing the rate of recirculation). Conversely, as the amount of air within portion 16 decreases (i.e., $h_1$ decreases), the diameter or size of the portion of valve 34 that is resident within orifice 30 increases, thereby decreasing the area through which air and vapor may enter tube 28 (i.e., reducing the rate of recirculation). Once portion 16 is substantially filled with fuel and substantially no air or vapor is resident within portion 16, valve 34 seals orifice 30, thereby preventing liquid fuel from entering recirculation tube 28.

It should be realized that the air separation chamber 16, valve 34 and tube 28 automatically and controllably regulate the amount of air and vapor recirculation in accordance with the amount of air or vapor within chamber 16. In this manner, system 10 efficiently and automatically regulates the recirculation of vapor and substantially reduces the amount of vapor that is released into the atmosphere.

Outflow regulating portion or assembly 18 ensures that the air separation chamber 16 is substantially filled with fuel. Particularly, the stiffness or "spring constant" of spring 46 is determined or selected in order to allow spring 46 to be compressed, thereby moving diaphragm 44 from its "closed" position end 40 to its "open" position and allowing fuel to flow through end 40 of conduit 36, only if the pressure in the chamber 16 equals the pressure generated by the fuel in chamber 16 is slightly less than height $h_2$ (e.g., when chamber 16 is substantially full).

It should be understood that the invention is not limited to the exact embodiment or construction which has been illustrated and discusesed above, but that various changes and modifications may be made without departing from the spirit of and the scope of the invention as is set forth in the fallowing claims.

What is claimed is:

1. A method for controlling vapor recirculation within a fuel tank comprising the steps of:
   providing a filler tube;
   connecting said filler tube to said fuel tank;
   providing a recirculation tube which is communicatively coupled to said filler tube;
   providing a first tank portion which is communicatively coupled to and selectively receives said fuel from said filler tube, said first tank portion including an aperture which communicates with said recirculation tube;
   controllably varying an area within said aperture through which air and vapors may pass into said recirculation tube, effective to automatically regulate air and vapor recirculation based upon an amount of fuel, air and vapor within said first tank portion;

wherein said fuel tank further comprises a second tank portion which is communicatively coupled to said first tank portion and which selectively receives fuel from said first tank portion; and providing an outflow regulator which is disposed between said first tank portion and said second tank portion and which selectively controls the amount of fuel which is transferred from said first tank portion to said second tank portion, effective to ensure that said first tank portion remains substantially filled with fuel.

2. The method of claim 1 wherein said fuel tank is disposed within a vehicle.

3. The method of claim 1 further comprising the steps of:

providing an amount of fuel within said first tank portion, and a buoyant member which floats upon said amount of fuel and which includes a tapered valve which is selectively disposed within said aperture, said tapered valve being effective to controllably vary said area within said aperture through which air and vapors may pass into said recirculation tube.

4. The method of claim 1 further comprising the steps of:

providing a dynamic seal including a housing, a convex sealing member, and spring member coupled to said housing and said convex sealing member; and mounting said dynamic seal within said filler tube, effective to cause said convex sealing member to selectively engage an inner surface of said filler tube, effective to allow fuel to pass through said filler tube, while substantially preventing air from passing through said filler tube and into said fuel tank.

5. The method of claim 4 wherein said convex sealing member is semi-spherical in shape.

6. The method of claim 4 wherein said fuel is delivered to said filler pipe by use of a nozzle which provides a certain fuel flow rate, said method further comprising the steps of:

selecting a spring constant of said spring member which is proportional to said fuel flow rate.

7. A fuel system comprising:

a filler tube which selectively receives vaporific fuel from a fuel dispensing nozzle;

a recirculation tube which is communicatively coupled to said filler tube;

a first tank portion which is communicatively coupled to and selectively receives said vaporific fuel from said filler tube, said first tank portion including an aperture which communicates with said recirculation tube, an amount of fuel, and a buoyant member which floats upon said fuel and which includes a tapered valve which is selectively disposed within said aperture, said tapered valve being effective to controllably vary an area within said aperture through which vapors may pass into said recirculation tube, thereby automatically regulating vapor recirculation within said fuel system based upon an amount of fuel and vapor within said first tank portion;

a second tank portion which is communicatively coupled to said first tank portion and which selectively receives and stores fuel from said first tank portion; and an outflow regulator which is disposed between said first tank portion and said second tank portion and which selectively controls the amount of fuel which is transferred from said first tank portion to said second tank portion.

8. The fuel system of claim 7 wherein said outflow regulator comprises a tube having a first end which communicates with said first tank portion and a second end which communicates with said second tank portion, and a diaphragm member which selectively engages said second end, thereby selectively controlling the flow of fuel from said first tank portion to said second tank portion.

9. The fuel system of claim 8 further comprising a spring member which compressibly retains said diaphragm member against said second end, until a predetermined amount of fuel is present within said first portion.

10. The fuel system of claim 7 wherein said filler tube comprises a widened portion, said fuel system further comprising:

a dynamic seal which is operatively disposed within said widened portion and which is adapted to selectively engage an inner surface of said widened portion, effective to allow fuel to pass through said filler tube, while substantially preventing air and vapor from passing through said filler tube and into said first tank portion.

* * * * *